(12) United States Patent
Ljubich

(10) Patent No.: US 7,635,162 B2
(45) Date of Patent: Dec. 22, 2009

(54) BICYCLE SEAT

(76) Inventor: Paul Ljubich, 203 Ross La., Linwood, NJ (US) 08221

(*) Notice: Subject to any disclaimer, the term of this patent is extended or adjusted under 35 U.S.C. 154(b) by 0 days.

(21) Appl. No.: 11/707,004

(22) Filed: Feb. 16, 2007

(65) Prior Publication Data

US 2007/0182223 A1  Aug. 9, 2007

Related U.S. Application Data

(63) Continuation-in-part of application No. 11/127,139, filed on May 12, 2005, now Pat. No. 7,178,869.

(51) Int. Cl.
*B62J 1/00* (2006.01)
(52) U.S. Cl. ..................................... 297/201
(58) Field of Classification Search ................ 297/195, 297/1, 201, 202, 215.1
See application file for complete search history.

(56) References Cited

U.S. PATENT DOCUMENTS

| | | | | |
|---|---|---|---|---|
| 604,347 A | * | 5/1898 | Bray | 297/201 |
| 608,682 A | * | 8/1898 | Jameison | 297/201 |
| 609,944 A | * | 8/1898 | Page | 297/202 |
| 622,357 A | * | 4/1899 | Hitchcock et al. | 297/201 |
| 629,956 A | * | 8/1899 | Craig | 297/201 |
| 6,193,309 B1 | * | 2/2001 | Gootter et al. | 297/202 |
| 6,290,291 B1 | * | 9/2001 | Kojima | 297/201 |
| 7,024,712 B2 | * | 4/2006 | Fujita et al. | 5/653 |

* cited by examiner

*Primary Examiner*—Peter R. Brown
(74) *Attorney, Agent, or Firm*—Bacon & Thomas, PLLC

(57) ABSTRACT

A bicycle seat assembly having a platform defining two transversely extending wing sections and a forwardly extending horn section, and a pod mounted on each wing section, which have a thickness variance about their periphery and in a central concave portion. The pods are provided with pins having splined walls which engage in slots having grooved peripheries.

12 Claims, 12 Drawing Sheets

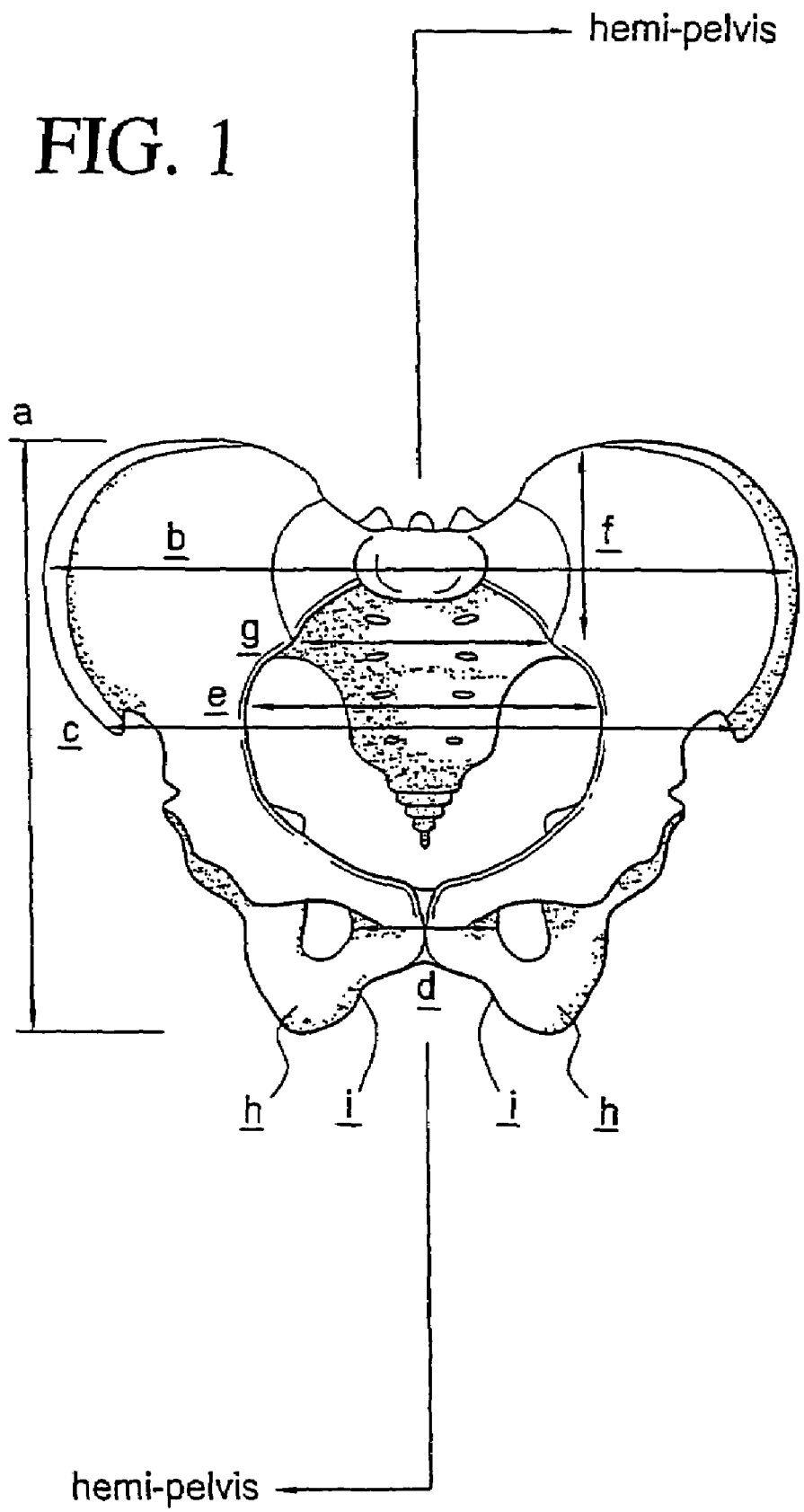

FIG. 5c
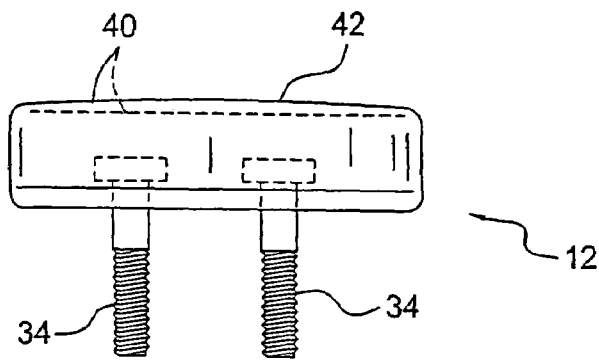
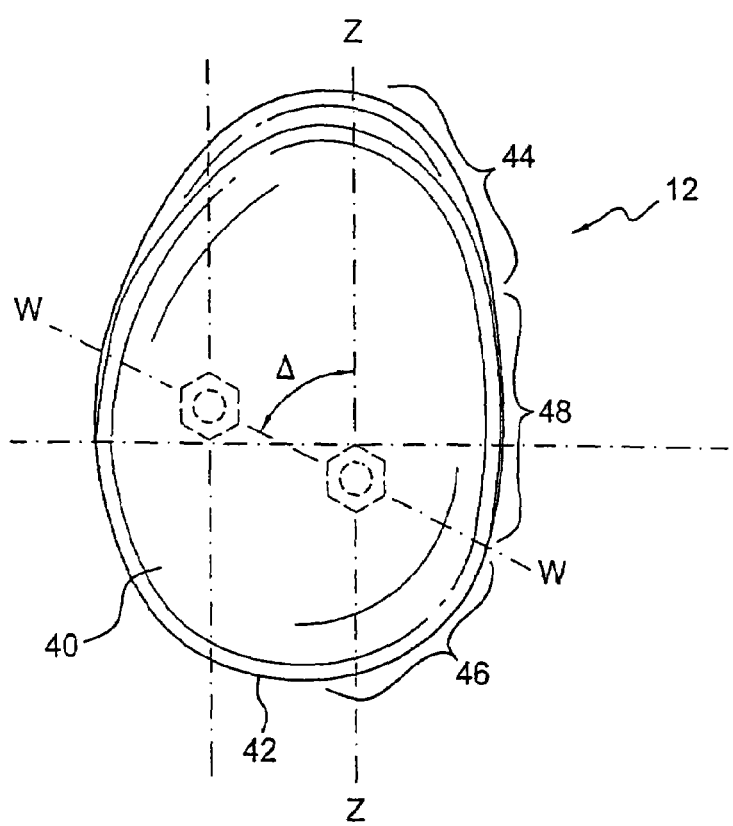
FIG. 5a
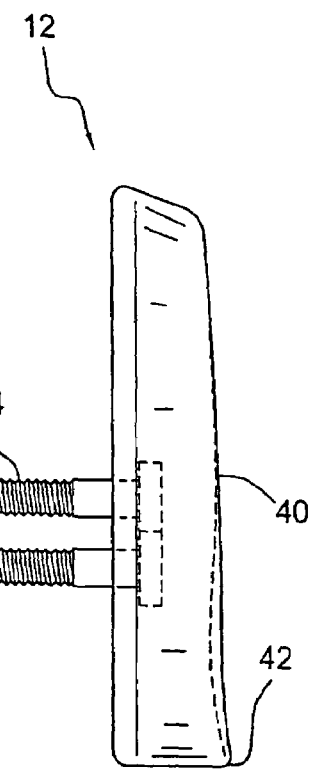
FIG. 5b

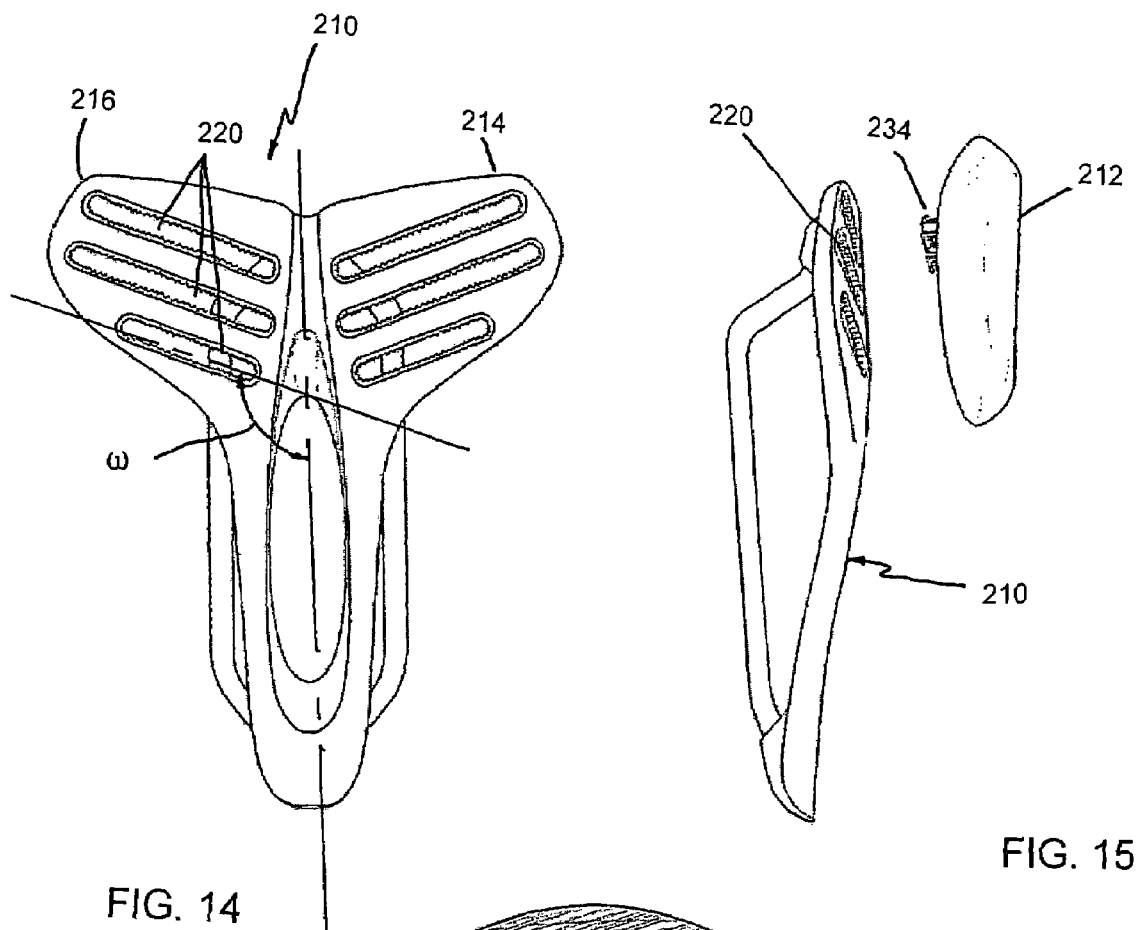
FIG. 14
FIG. 15
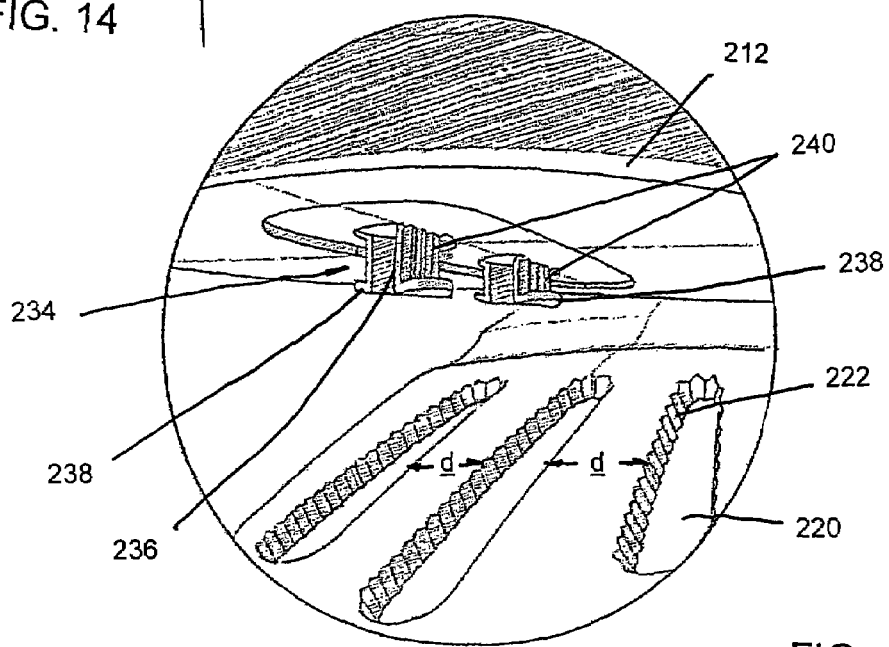
FIG. 16

BICYCLE SEAT

CROSS-REFERENCE TO RELATED APPLICATION

This application is a continuation-in-part of U.S. patent application Ser. No. 11/127,139, filed May 12, 2005.

TECHNICAL FIELD

The present invention relates to a bicycle seat (saddle) assembly which includes two pods mounted on one of two platforms. The assembly, while developed for a bicycle, can be used with other cycles, such as stationary or exercise cycles, tricycles, unicycles, motorcycles, and the like.

BACKGROUND OF THE INVENTION

Bicycle riding provides pleasure, competition and has the concomitant health benefits of aerobic exercise. The bicycle seat or saddle is a major interface between the rider and the bicycle. It is also the chief support interface between the rider and the bicycle.

To better appreciate this relationship, reference is made to FIG. 1 which schematically shows the bone structure of the human pelvis. The pelvis is a bony structure located at the base of the human spine. The male and female pelvis differ, but the differences are not significant for purposes of understanding the present invention. References a-g identify various dimensions associated with the pelvis. These are common to both male and female. The pelvis is symmetrical in the width direction, with a identifying the pelvic height, b identifying the pelvic breadth, c identifying the anterior upper spinal breadth, d identifying the breath at the pubic symphysis, e identifying the transverse diameter of the pelvic brim, f identifying the height of the ilium, and g identifying the breath of the Sacro-iliac. The bone areas denoted by h are known as the ishial tuberosities or sit bones, and the bone area designated by l are the ischiopubic rami.

Most of the support occurs between the sit bones and the saddle. Depending on the cyclist's posture some support is provided between the horn of a typical saddle and the pubic symphysis/ischiopubic rami (d and l in FIG. 1). The combination of the sit bones and the pubic symphysis/ischiopubic rami provide a bone span which affords a three pronged support interface between the cyclist and the seat.

Since the seat is the chief support interface between the cyclist and the bicycle, the comfort of the cyclist is important to both the pleasure and safety of riding. The size, shape, flexibility, orientation and slickness of the seat will affect the user. Greater comfort of the rider is paramount since greater pleasure and greater duration of riding is a direct consequence of comfort. This translates into better health benefits and less injury.

Almost all known bicycle saddles have a wider aft portion and a narrower forward horn portion. The wider aft portion engages the sit bones and midline soft tissue. The horn provides support to the pubic symphysis/ischiopubic rami and lateral stability by contacting the medial aspects of the rider's thighs.

The typical bicycle saddle has a convex aft portion to provide some degree of pelvis conformation. Pressure from the aft portion of the saddle can cause injury to the tissues around and adjacent the sit bones most notably the pudenal nerve, artery, & vein and cavernous nerve, artery and vein. See, Oberpenning, F., et. al. The Alcock Syndrome: Temporary Penile Insensitivity due to Compression of the Pudenal Nerve within the Alcock Canal, Journal of Urology, 151: 423-425, 1994; and Pavelka, E. Uncomfortably Numb, Bicycling, 39: 89-92, 1998. Some saddles have been designed to reduce pressure to the softer midline structures by providing a fixed slit or space in the middle of the saddle (along the long axis). See, Taylor K. S., et. al. Using an Experimental Bicycle Seat to Reduce Perineal Numbness, The physician and Sportsmedicine, 30: No. 5, May, 2002. Even with a midline space present, there is no accommodating differences in the distance between the ischial tuberosity or interischial tuberosity distance.

See, Niels C. C. M. Moes, Distance Between the Points of Maximum Pressure for Sitting Subjects, International Design Conference—Design 2000, Dubrovnik, May 23-26, 2000. FIGS. 2a and 2b are a reproduction of FIG. 3 of the noted article. The histogram in FIG. 2b shows the variation in the interischial tuberosity distance T. The contour line picture in FIG. 2a show the maximum pressure points. This lack of accommodation for the interischial tuberosity distance can lead to pressure at midline softer structures, which can still lead to lack of blood flow or pressure trauma to the nerves. Additionally, the midline space found in some saddles does not alleviate pressure to softer tissues trapped between the pubic symphysis/ischiopubic rami and horn. Both the lack of accommodating variability in interischial tuberosity distance and pressure from sandwiching tissues between the horn and pubic symphysis/ischiopubic rami can still lead to genital numbness and penile dysfunction.

A seat for a bicycle is needed, therefore, which not only addresses the difficulties noted above but provides a solution to these difficulties.

SUMMARY OF THE INVENTION

What can be understood from a consideration of the above, is that while the human pelvis has the same basic design for all humans, with the exception that the male and female pelvis differ slightly, they have different sizes. That is, the spacing between the points of the sit bones are not only different for males and females, they are also different amongst males and amongst females. For maximum comfort, it would be desirable to be able to accommodate this difference, and this is what the present invention does by providing the adjustability of the pods and a thickness variant of the pods over their planar expanse.

The present invention provides, therefore, the state-of-the-art with a seat assembly which reduces, if not, eliminates the difficulties noted above and provides maximum comfort to the user. The assembly of the present invention can be utilized on a mobile or stationary bicycle. The assembly is designed to provide support to each hemi-pelvis independently. Each ischial tuberosity (sit bone) is supported by a pod which is conforming to the sit bone, and is adjusted for this purpose, or has a desired thickness variant over its planar expanse. The pods are supported by a specified portion of a the platform. The pods are made of silicone, or polyurethane rubber, or carbon fibers, or other similar material which is flexible, durable and also conforming. According to one variant, the pods are mounted to the platform in a unique fashion which allows medial, lateral, forward, aft and rotational adjustment (universal adjustment); thereby providing individual support to each hemi-pelvis. According to another variant, the pod thickness variance is chosen to insure comfort to the largest percentage of the population.

The configuration, including thickness, material composition and adjustment factor of the pods result in an assembly which removes pressure from midline structures such as the pudenal and cavernous nerves, arteries and veins as well as other tributaries to the genitalia. The platforms are made of molded plastic although they can be made of other materials (e.g. metal).

The platforms have a "scooped-out" shape allowing for anterior rotation or roll of the pelvis without applying pressure to the soft tissue structures between the "horn" and pubic symphysis/ischiopubic rami. The soft, flexible consistency of the polyurethane or silicone rubber of the pod allows the pods to conform to the "scooped-out" shape of the platforms when the rider is leaning (anteriorly) over the handlebars. Such a position is more common in racing bicycles.

The platforms are attached to the bicycle seat tube using perpendicular bars which are integral to the platform and an attachment collar connected to the bars.

The seat assembly of the invention is adaptable to the rider in a way not previously possible. The design of the platforms and the ability to adjust the pods on the platform are unique to this bicycle seat.

Pod thickness provides the additional advantage of separation between pubic symphysis/ischiopubic rami and the platform by slightly raising the pelvis above the platform. The lift attributed to the thickness of the pods and the "scooped-out" conformation of the pod, provide greater separation between the pubic symphysis/ishiopubic rami and the platform. Greater separation between the pubic symphysis/ischiopubic rami and the platform decreases the squeeze of the soft tissue structures between the pubic symphysis/ischiopubic rami and the platform.

BRIEF DESCRIPTION OF THE DRAWINGS

FIG. 1 is a schematic illustration of the bone structure of the human pelvis.

Figure 2A:
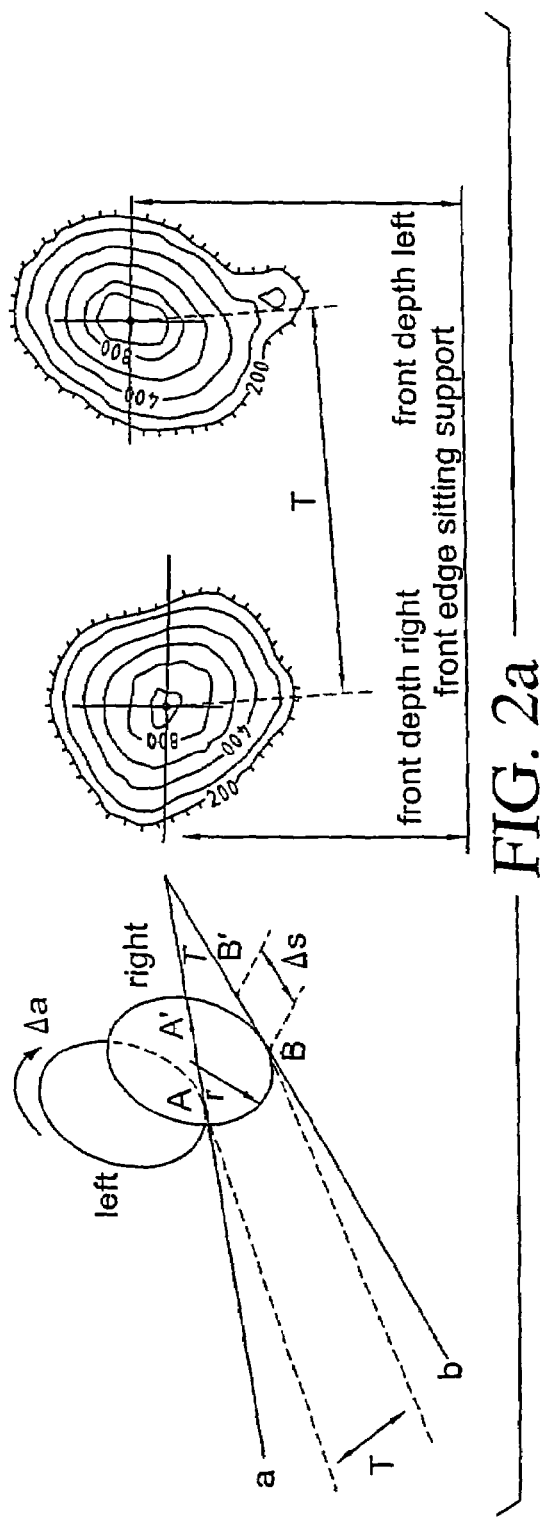
FIGS. 2a and 2b illustrate data derived from International Design Conference—Design 2000, noted above.
Figure 2B:
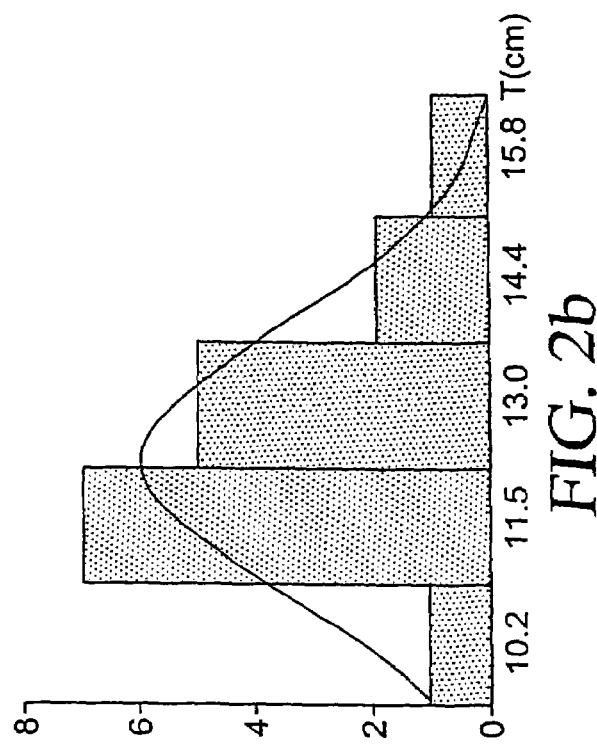
Figure 3:
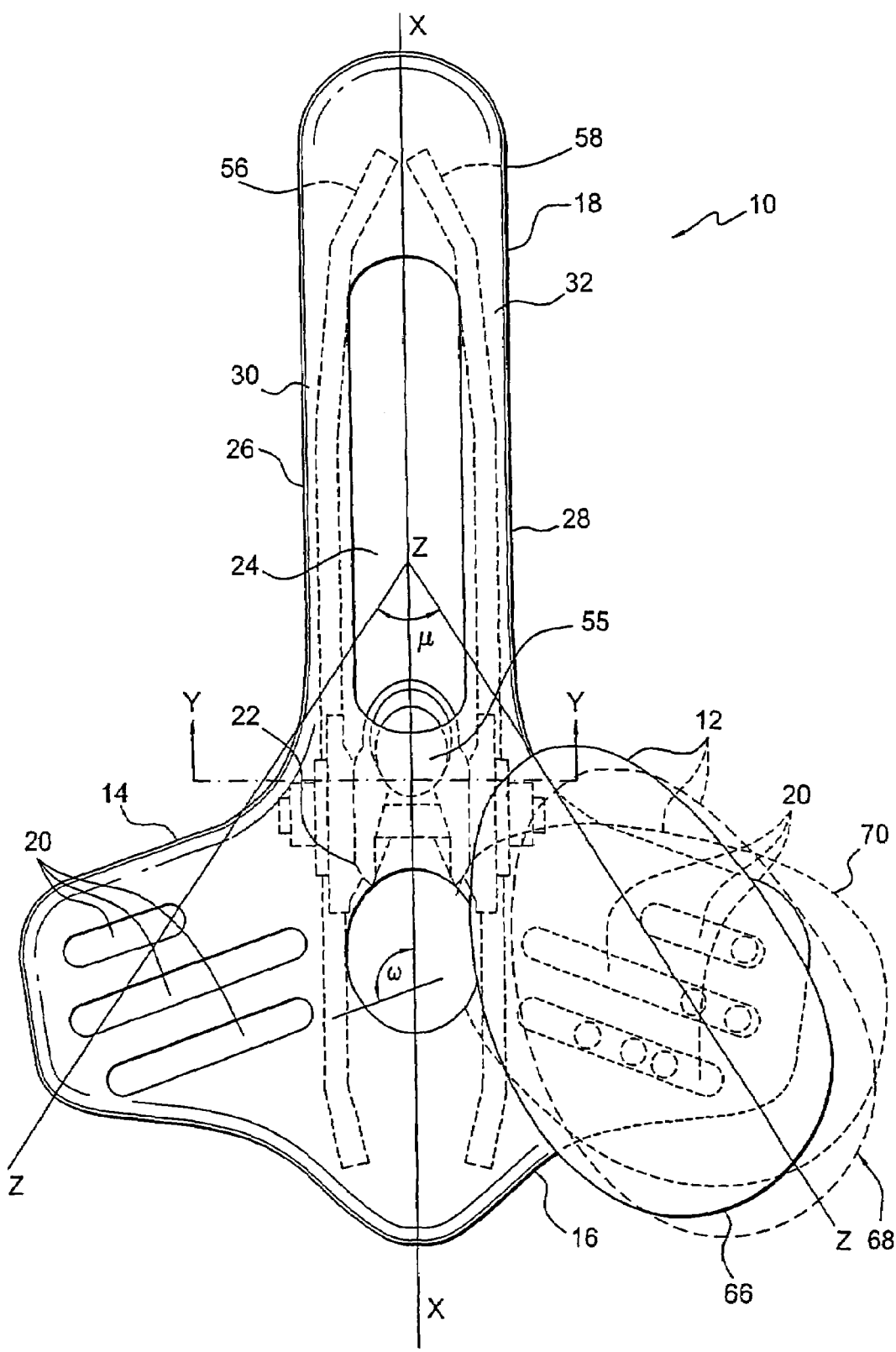
Figure 4:
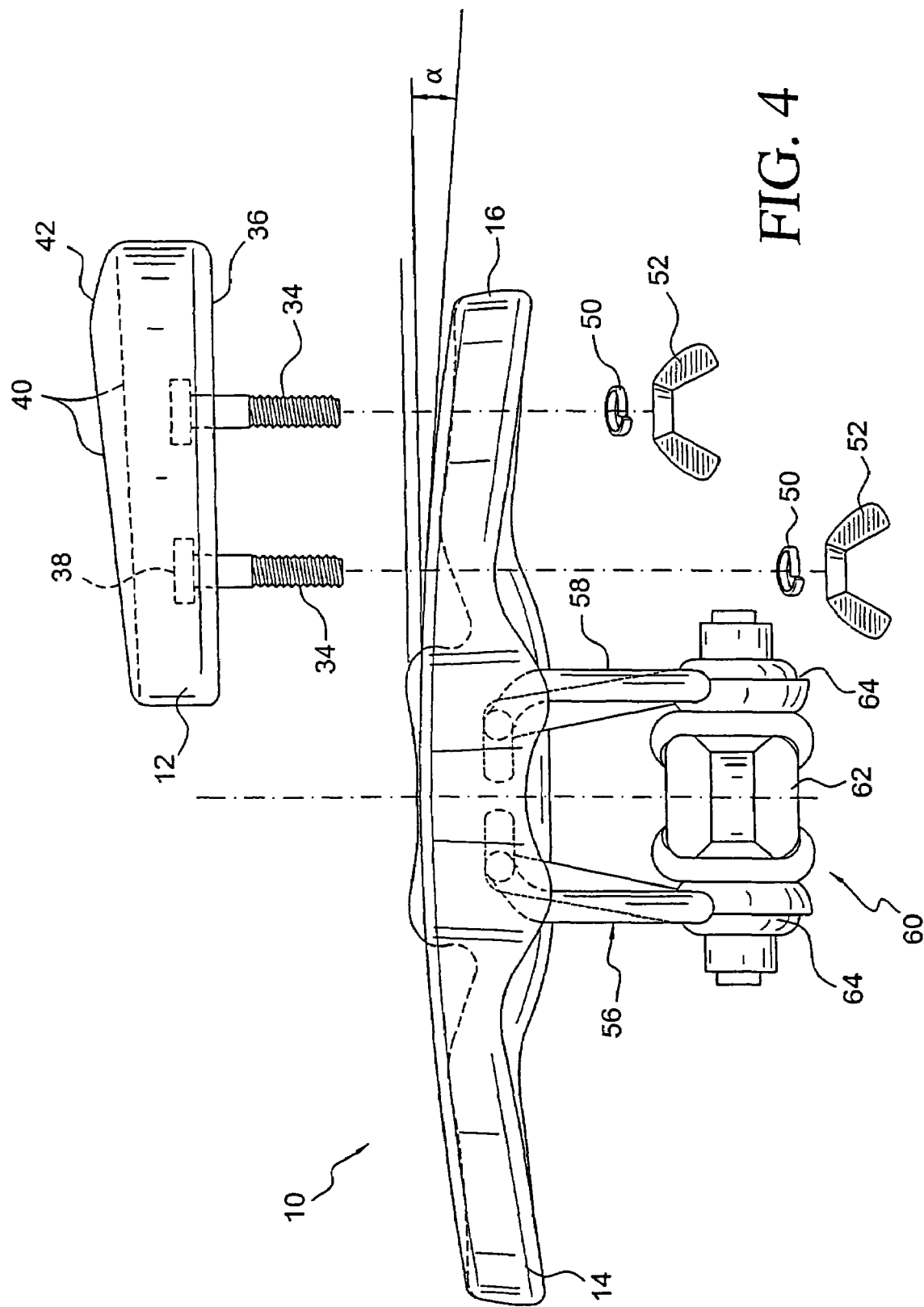
Figure 6:
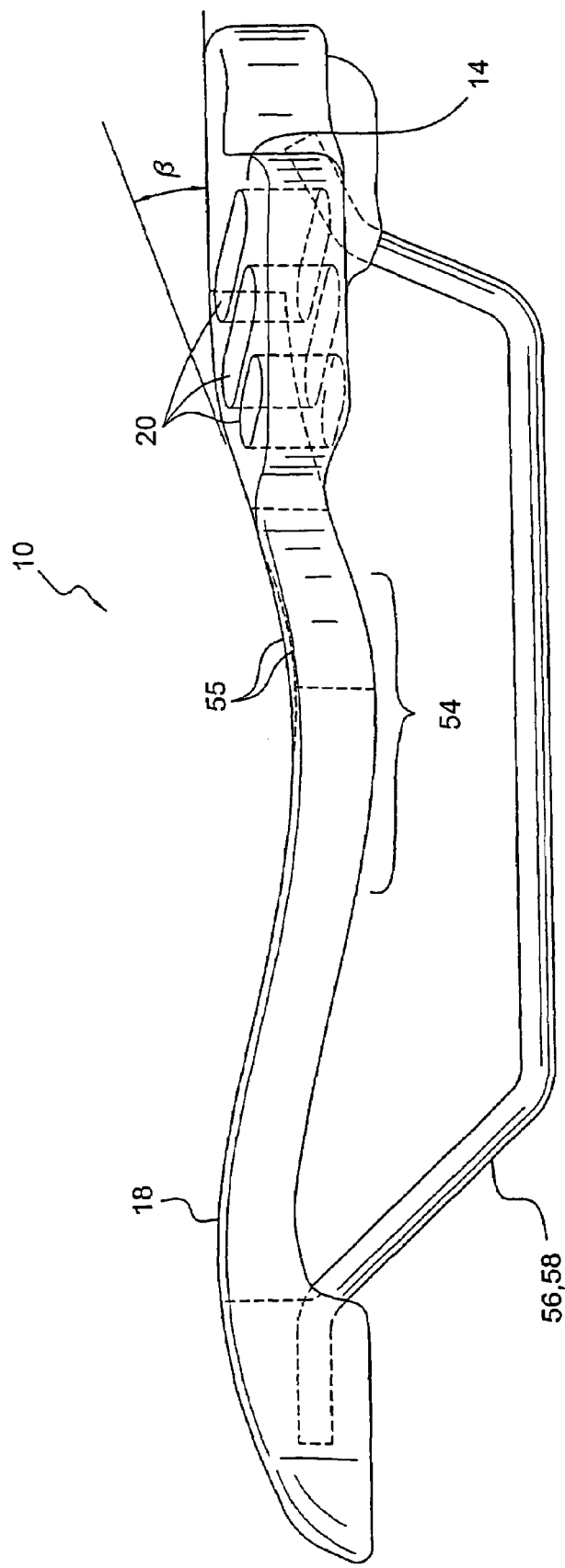
Figure 7:
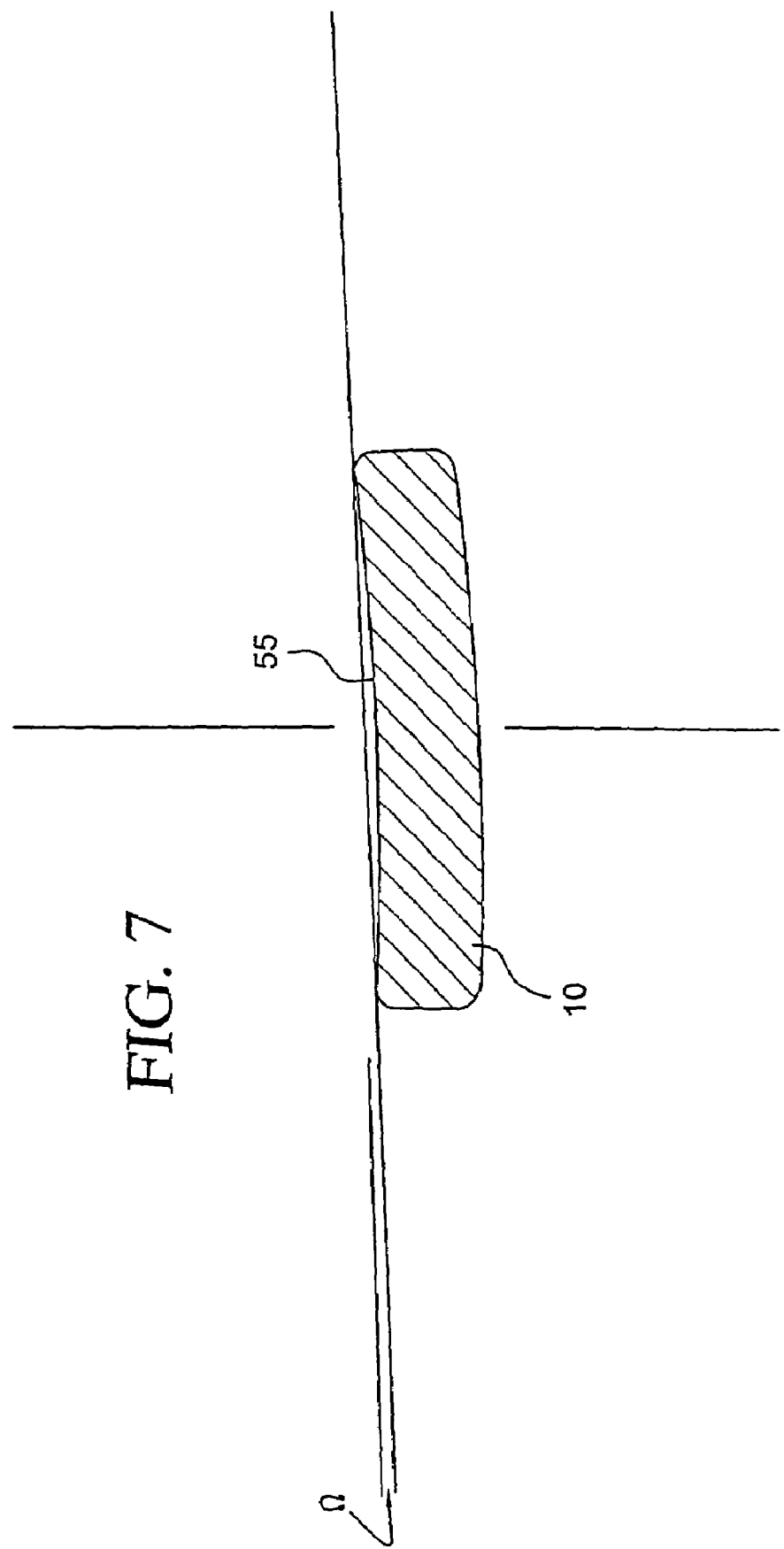
Figure 8:
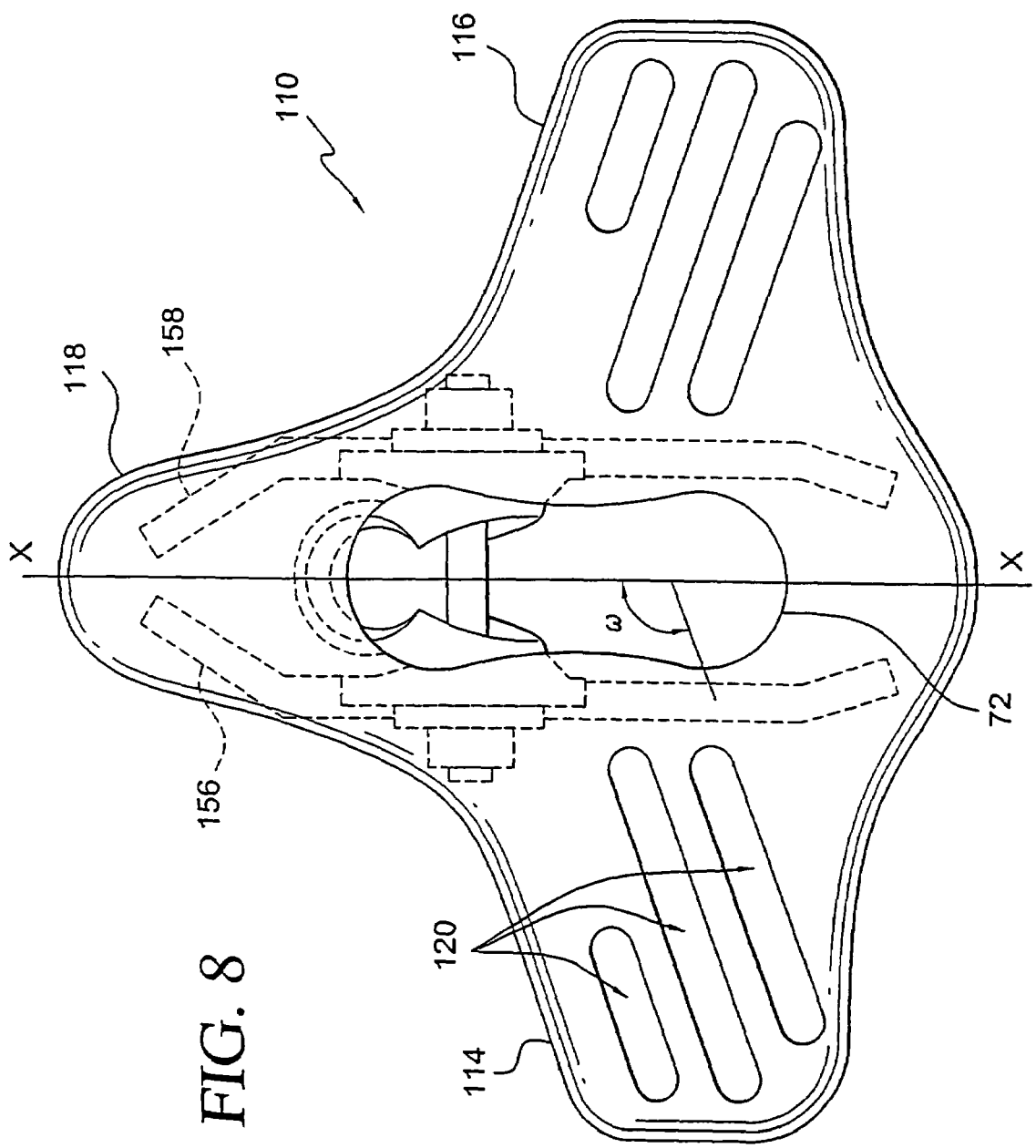
Figure 9:
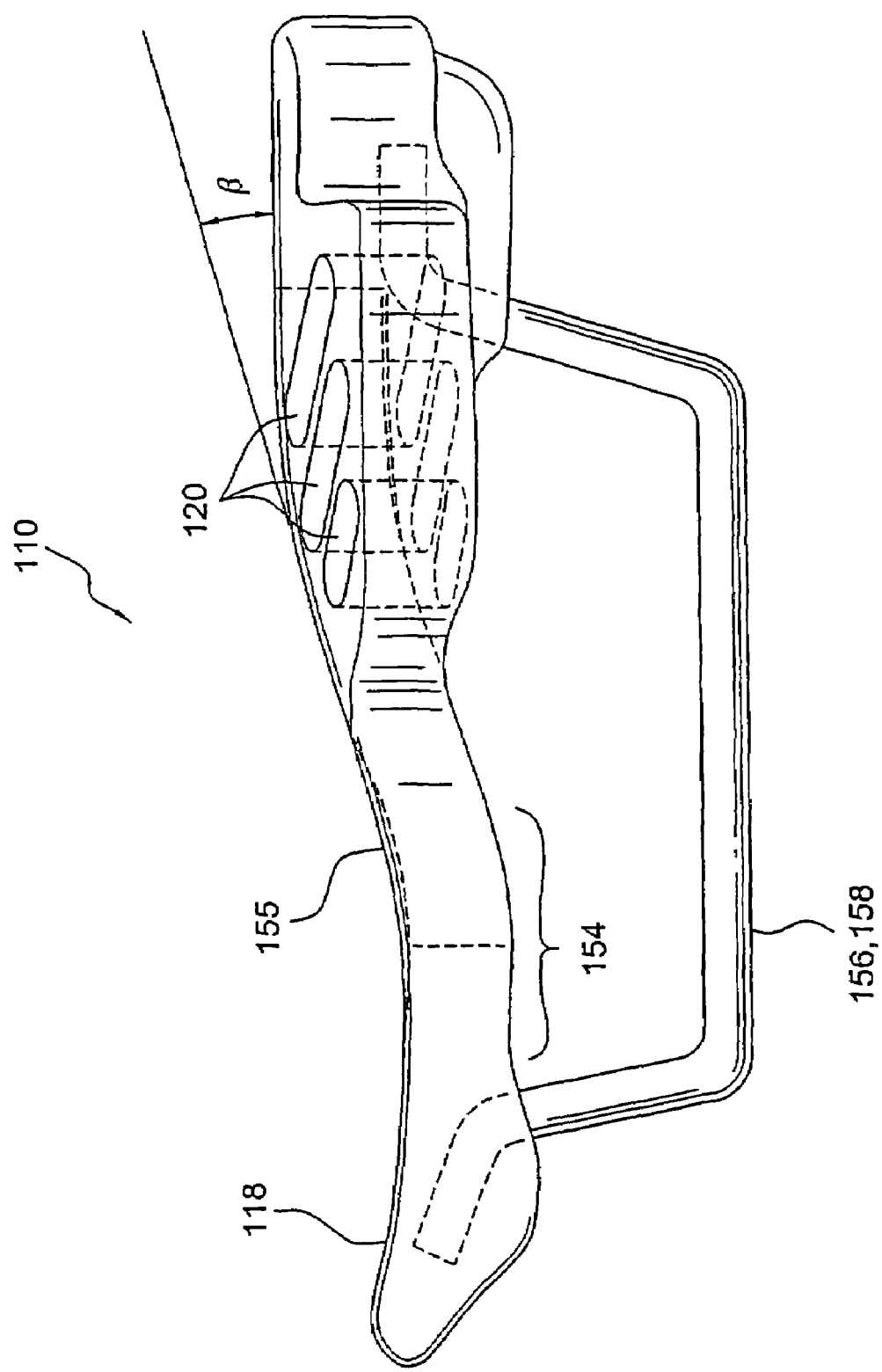
Figure 10:
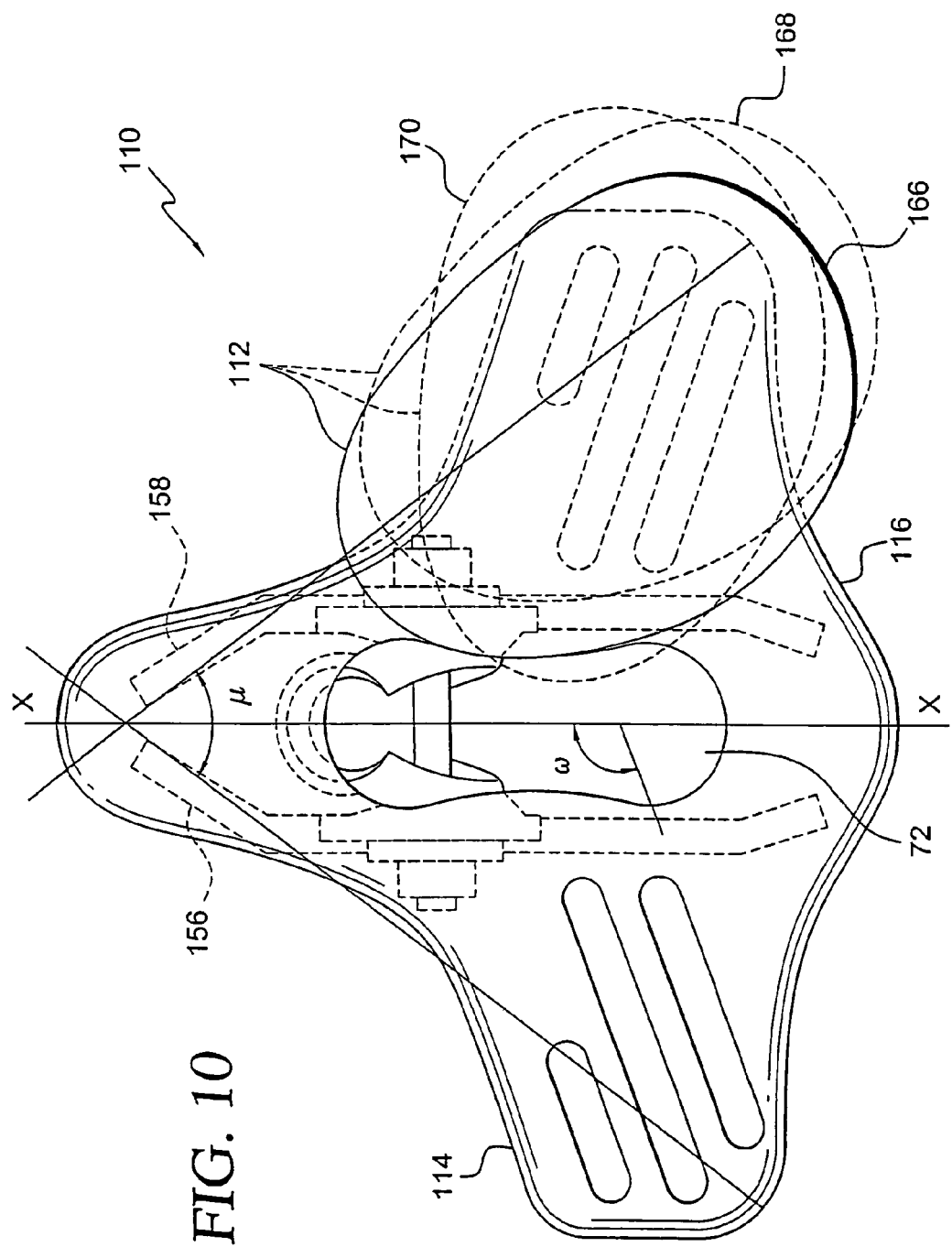

Thirteen figures have been selected to illustrate several preferred embodiments of the invention. These are:

FIG. 3, which is a top plane view of a platform of one embodiment of the assembly according to the present invention;

FIG. 4, which is a rear end view of the platform of FIG. 3 with a pod to be assembled onto the right-side of the platform;

FIGS. 5a, 5b and 5c are end, plane and side views, of a pod according to the present invention;

FIG. 6, which is a left-side elevational view of the platform of FIG. 3 with a pod to be assembled to the left-side of the platform;

FIG. 7, which is a cross sectional view of the platform in its transverse direction (along line Y-Y of FIG. 3);

FIG. 8, which is a top plane view of a platform of another embodiment of the assembly according to the present invention;

FIG. 9, which is a left-side elevational view of the platform of FIG. 8 with a pod to be assembled; and FIG. 10, which is a top plane view of the assembly of FIG. 8 with a pod mounted thereto in various positions. A similar range of positions are available for the platform of FIG. 3.

Figure 11:
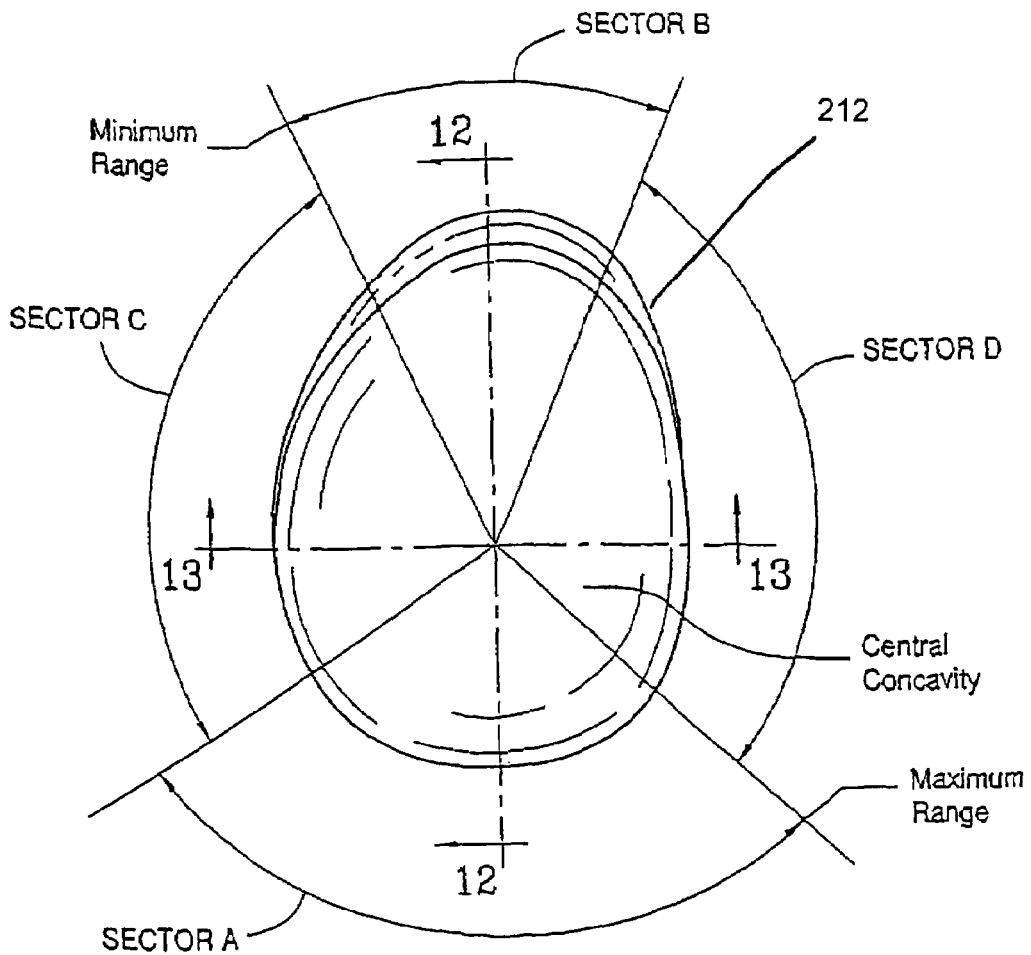
Figure 12:
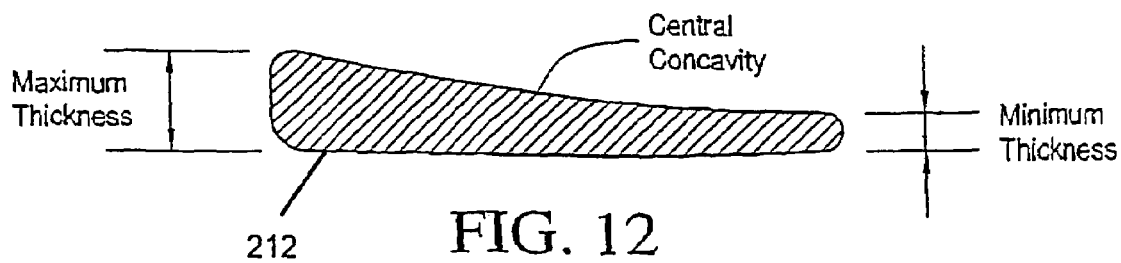
Figure 13:
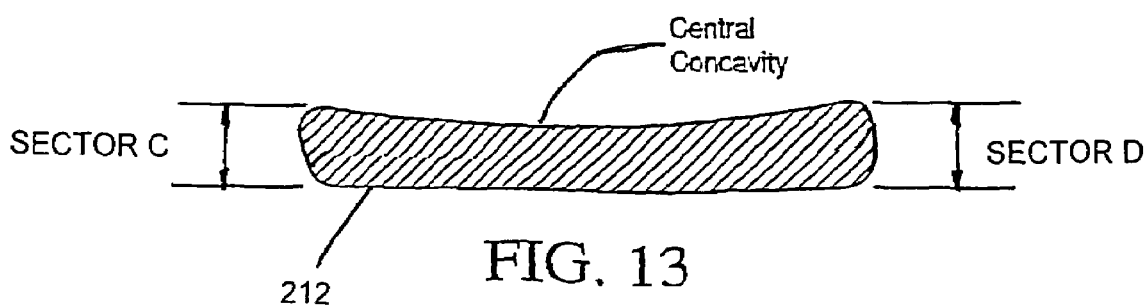

FIG. 11 is a top planar view of an alternate pod with thickness variant;

FIG. 12 is a cross-sectional view along lines 12-12 of FIG. 11;

FIG. 13 is a cross sectional view along lines 13-13 of FIG. 11;

FIG. 14 is a top plan view of a platform of an alternative embodiment of the invention;

FIG. 15 is a side view, partially exploded, of the platform of FIG. 14 with a pod; and FIG. 16 is an enlarged detail view of the mounting structure of the pods to the platform of FIG. 14.

DESCRIPTION OF THE PREFERRED EMBODIMENTS

The seat assembly of each embodiment includes a platform 10, 110, and two-pods 12, 112, per platform and necessary mounting hardware to mount the pods to the appropriate side (wing) of the platform. The platforms are mounted onto the seat tube (not shown) of the bicycle.

In each embodiment, the platforms 10, 110 can be molded as a single piece structure each including an aft section defining wings 14, 114 and 16, 116 from which extends a forward section or horn 18, 118. The aft section (posterior) and forward section (anterior) are symmetrical relative to the long axis X-X (centerline).

The platforms 10, 110 can be molded as a plastic part or they can be fabricated of sheet metal with sufficient thickness, or made of other materials, to provide the platform with the necessary stiffness to support the cyclist of any body weight.

Turning to the embodiment illustrated in FIGS. 3-6, each wing 14 and 16 is provided with slots 20 (preferably three) of varying length for pod adjustment. The slots 20 form an angle ω with the centerline X-X. The angle ω is approximately 110°. The diameter of slots 20 are approximately 5/16 in. In that region of the aft section where the two wings are joined, an opening 22 is provided for weight saving. The horn 18 is provided with an elongated slot 24. The slot 24 provides room for perineal structures/genitalia. The horn 18 defines rails 26 and 28 which outline the length of the slot 24. According to one embodiment, the rails 26 and 28 are approximately ½ inch in width, while the width of the slot 24 is approximately 1½-3 inches. The width of the slot 24 is based on accommodating the breadth of the symphysis and contained soft tissue structures of perineum (FIG. 1). The upper surface of the rails 26 and 28 are indicated as surfaces 30 and 32, respectively. These surfaces can contact the most anterior/inferior aspects of the pubic symphysis/ischiopubic rami when a cyclist leans forward and therefore rolls his/her pelvis forward. Contact between the inferior/anterior aspects of the pubic symphysis/ischiopubic rami with surfaces 30, 32 allows for lateral stability, better control of the bicycle and distribution of weight across the ischiotuberosities and anterior aspects of the pelvis.

A pod 12 (FIGS. 3, 4 and 5) is mounted to each wing 14 and 16. Each pod 12 includes a pair of spaced apart threaded bolts 34 which extend outwardly from a flat, bottom surface 36 of the pod. The head 38 of each bolt is embedded in the pod. This can be accomplished when the pods are manufactured, or the pods can be provided with a blind bore with a recess (not shown) at the blind end. In this way the bolt can be inserted in the blind bore with its head end and at the end of the blind bore the head is then slid into the recess.

The pods 12 may be constructed also as a molded part, or as a metal frame with an elastic fill material. In either case the top surface 40 of the pod is contoured. The posterior lip 42 of the top surface 40 allows for posterior stability. A gentle rise can be seen along the medial border of the pods. According to one example, the pods 12 are approximately ¾ to 13/16 inches thick and are made of flexible (although durable) material such as silicone rubber, polyurethane rubber, or similar material. The pods may have a variable hardness. Centrally embedded in each pod are the two ¼ inch bolts 34. Flexibility of the anterior portion 44 (FIG. 5a) of the pods is paramount as it relates to the angle β, discussed below. The posterior portion 46 may have variable flexibility and the central portion 48 is preferably hard so as to fix the bolts. The bolts 34 are, preferably situated at an acute angle Δ as shown in FIG. 5, which is shown in relation to the long axis Z-Z of the pods and the axis W-W connecting the bolt centers. Preferably, Δ is 65°.

When the pods 12 are mounted to a respective platform, the bolts 34 are secured by a lock washer 50 and a nut 52 (FIG. 4). The long axis Z-Z of the pods intersect the horn 18 at the axis X-X to form an angle μ (FIGS. 3 and 10), which varies from 50° to 160 °.

The anterior portions of the pods 12 are flexible and durable so as to accommodate anterior roll or sliding of the pelvis. As shown in FIG. 6, an extension of the top surface of the platform relative to the posterior surface of the platform toward the rear edge of the platform forms an angle β which is from 7°-20° sloped downward to the ground. This angle leads to the "scooped" (concave) curve 54 of the platform. This "scooped" conformation provides clearance for the soft tissue structures of the perineum which are between the pubic symphysis/ischiopubic rami and the horn of the seat. Anterior portions of the pods 12 need to be flexible so as to conform to the downward inclination of the "scooped" curve. Thus, the flexible anterior aspects of the pods 12, the downward "scoop" formed by the angle β, and the angle μ, permit a natural conformity to the human pelvis whether in an upright position, completely forward (racing) position, or anything in between.

In addition to the angle β, an angle Ω (FIG. 7) allows for slight midline movement/cupping or balance. The angle Ω can vary between 0° to 5°, creating the contour 55.

As shown in FIGS. 3, 4 and 6, the platform 10 is provided with bars 56 and 58 which extend spaced apart transversely and extend horizontally relative to the platform centerline (axis X-X) almost the full length of the platform and are embedded at the anterior portion and posterior portion of the platform as shown in FIG. 6. The bars 56 and 58 provide stiffness to the seat and serve to support the seat assembly on the bicycle seat tube (not shown) with a mounting arrangement 60. The mounting arrangement 60 is adjustable along the bars 56 and 58 and includes a bicycle tube engaging bracket 62 situated between bar grasping brackets 64. Between the tube engaging bracket 62 and the bar grasping brackets 64 conforming serration surfaces are provided (not shown) for adjusting the angular relationship of the post engaging bracket and the bar grasping brackets.

The further embodiment shown in FIGS. 8-10 is similar to the embodiment previously discussed, except that the horn 118 of the platform 100 is shorter than the horn 18 of platform 10.

To adjust the pods 12, 112, the bolts 34 are loosened and the pod adjusted medially or laterally along the slots 20, 120, as shown in FIGS. 3 and 10 (positions 66 and 68 in FIG. 3 and 166 and 168 in FIG. 10) Pods 12 and 112 can be removed from the slots 20, 120, rotated medially and repositioned in slots 20 and 120 (position 70 in FIG. 3 and 170 in FIG. 10). In this new position, the pods can provide greater lateral support to accommodate a wider buttock. While in position 70, 170, medial and lateral movement of the pods can still be achieved. Medial, lateral, rotational, forward and aft adjustments allow for optimal positioning of the pods. Once adjusted, the bolts 34 are then tightened to firmly secure the pod to their respective wing and the bicycle is then ready to be mounted by the rider.

Both wings 14 and 16 slope downwardly through an angle α (FIG. 4). The pods are mounted to the wing so that its surface 36 is engaged flush with the top surface of the wing. This causes the pod to be canted downwardly by the angle α. The top surface of the pod is, however, contoured so accommodate this angle. One of the purposes of the angle α is to facilitate the molding of the platform. The range of the angle a is typically 0-7 degrees.

In the embodiment shown in FIGS. 8-10, the slot 72 replaces the slot 24 and opening 22 which are combined as slot 72. The slot 72 is positioned further back of the platform 110 because the horn 118 is shortened. Aside from the above noted distinction, the embodiment shown in FIGS. 8-10 is like that shown in FIGS. 3, 4 and 6. The pods of FIGS. 5 and 7 are used with either embodiment.

With either embodiment, a bicycle seat assembly is provided according to which the pod is adjustable through a wide range to accommodate the rider. The adjustment is made so that comfort is maximized.

Reference to FIGS. 11 and 12 show the pods 212 and the thickness which creates the space for rider comfort. The thickness of the pods (12, 112 and 212) is important and provides a benefit to the rider. Clearly, the lateral and medial movement of the adjustable pods (12 and 112) has an additional significant advantage over fixed pods. Thickness of adjustable and even fixed pods to the uniquely conformed (angle β and "scooped-out" shape 54 and 154) platforms (10, 110) provide an independent attribute benefitting the rider. This unique thickness of the pods creates an elevation of the ischial tuberosities (sit bones) and therefore the pubic symphysis/ischiopubic rami above the platforms. Elevation of the pubic symphysis/ischiopubic rami above the platforms provides the noted space between the pubic symphysis/ischiopubic rami and platform for the soft tissues of the perineum. The "scooped-out" curve and angle β augments the space between the platforms and the pubic symphysis/ischiopubic rami.

Pod thickness varies from the posterior to anterior part of the pods. A slight centrally located concavity is also present. Posterior thickness of the pods ranges from 16-38 mm, and the anterior thickness ranges from 8-18 mm, and the thickness of the central concavity ranges from 8-14 mm. There is a sector A of maximum thickness over a range of 40° to 90° and a sector B of minimum thickness over a range of 20° to 60°. The range of posterior, anterior, central thickness and length of the above mentioned sectors are dependent on types of material (silicone rubber, polyurethane rubber, leather, vinyl, foam, etc) which are used to make the pods. That is, different materials have different inherent stiffnesses which can be taken into consideration.

An alternative embodiment for mounting the pods 212 can be seen by reference to FIGS. 14-16.

The platform 210 includes wings 214 and 216. Each of the wings has a plurality of slots 220. Each slot 220 is provided with a series of grooves or teeth 222 about their periphery, as shown most clearly in FIG. 16. A pod 212 is mounted to each wing 214 and 216. Each pod includes one or more pins 234. The pins 234 are configured to include essentially parallel walls 236 cantilevered to the bottom surface of its respective pod. At the free end of each wall 236 there extends a horizontal tab 238. On the outside surface of each wall 236 there are formed splines or teeth 240 which are dimensioned to engage within grooves or teeth 222.

To mount the pods 212 to a respective platform wing, the walls 236 of each pin 234 are deflected toward each other and inserted into a slot. Once in a slot, an adjustment along the slot can be made by merely grasping two corresponding tabs 238 and deflecting "squeezing" them together and sufficiently disengaging the splines from the grooves or teeth and then sliding the pin to another location in the slot. Releasing the two tabs then allows the walls 236 to again fit its splines within the grooves or teeth. The walls 236 have sufficient stiffness to allow for engagement and disengagement of the pins 234 in the slots 220.

To effect an angular adjustment of a pod, the pins of a given pod can be engaged in separate slots. The extent of the angular adjustment can be accomplished by the extent of the slot opening and their relative separation. For example the separation d shown in FIG. 16 can be varied from one platform to another, and the angle ω can also be varied from platform to platform.

What is claimed is:

1. A bicycle seat, comprising:
   a platform defining a centerline, the platform being symmetrical relative to its centerline, and having an anterior portion and a posterior portion along its centerline with the posterior portion having a width greater than the anterior portion, and the posterior portion defining a pair of wings extending transversely outwardly and in opposite directions from the platform centerline; and
   a pod mounted to each wing, wherein:
   each pod being configured such that its thickness varies from a maximum posterior thickness to a minimum anterior thickness,
   each wing includes at least one slot for mounting a pod thereto,
   each slot includes a series of grooves about its periphery; and
   each pod includes at least one pin extending outwardly from its bottom surface, each pin having generally parallel situated walls which can be deflected, with each wall having at least one spline which engages a groove in a respective slot.

2. The bicycle seat as defined in claim 1, wherein:
   said maximum thickness has a range of 16-38 mm.

3. The bicycle seat as defined in claim 1, wherein:
   said minimum thickness has a range of 8-18 mm.

4. The bicycle seat as defined in claim 1, wherein:
   said maximum thickness has a range of 1-38 mm and said minimum thickness has a range of 8-18mm.

5. The bicycle seat as defined in claim 1, wherein said maximum thickness has a planar extent of approximately 40° to 120°.

6. The bicycle seat as defined in claim 5, wherein:
   said maximum thickness has a range of 16-38 mm.

7. The bicycle seat as defined in claim 1, wherein:
   said minimum thickness has a planar extent of approximately 20° to 90°.

8. The bicycle seat as defined in claim 7, wherein:
   said minimum thickness has a range of 8-18 mm.

9. The bicycle seat as defined in claim 1, wherein:
   each pod is further configured such that its thickness in a central concavity has a range of 8-14 mm.

10. The bicycle seat as defined in claim 1, wherein said maximum thickness has a range of 1-38 mm, said minimum thickness has a range of 8- 8 mm, and a central concavity is provided with a thickness having a range of 8-14 mm.

11. The bicycle seat as defined in claim 1, wherein:
    each pod is configured to include a sector of maximum thickness, a sector of minimum thickness and two sectors of changing thickness between said maximum thickness and said minimum thickness.

12. The bicycle seat as defined in claim 1, wherein:
    each wall includes a tab which extends outwardly from its wall, said tabs serving for manual engagement to deflect parallel walls toward each other thereby allowing for engagement and disengagement of the spline and groove.

* * * * *